United States Patent
Inaoka et al.

(10) Patent No.: US 8,561,745 B2
(45) Date of Patent: Oct. 22, 2013

(54) SADDLE-TYPE VEHICLE

(75) Inventors: Hiroshi Inaoka, Saitama (JP); Teruhide Yamanishi, Saitama (JP); Kazuo Fujihara, Saitama (JP); Toshinao Takigawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/988,370

(22) PCT Filed: Nov. 14, 2011

(86) PCT No.: PCT/JP2011/076186
§ 371 (c)(1),
(2), (4) Date: May 20, 2013

(87) PCT Pub. No.: WO2012/070419
PCT Pub. Date: May 31, 2012

(65) Prior Publication Data
US 2013/0240281 A1    Sep. 19, 2013

(30) Foreign Application Priority Data
Nov. 25, 2010    (JP) .................................. 2010-262499

(51) Int. Cl.
*B62D 61/02*    (2006.01)
(52) U.S. Cl.
USPC ........................................................ 180/219
(58) Field of Classification Search
USPC ................. 180/219, 218, 216; 280/833, 835
See application file for complete search history.

(56) References Cited

U.S. PATENT DOCUMENTS

| 7,562,736 B2 * | 7/2009 | Eguchi et al. ................. 180/291 |
| 8,141,672 B2 * | 3/2012 | Kuramochi et al. ......... 180/69.4 |
| 8,371,270 B2 * | 2/2013 | Ishii .............................. 123/510 |
| 2011/0120796 A1 | 5/2011 | Kuramochi et al. |
| 2012/0312619 A1 * | 12/2012 | Inaoka et al. ................. 180/219 |

FOREIGN PATENT DOCUMENTS

| JP | 49-088172 U | 7/1974 |
| JP | 52-027317 Y1 | 6/1977 |
| JP | 62-079692 U | 5/1987 |
| JP | 63-004717 Y2 | 2/1988 |
| JP | 2000-335465 A | 12/2000 |
| WO | WO 2009/154120 A1 | 12/2009 |

OTHER PUBLICATIONS

International Search Report dated Feb. 14, 2012 corresponding to International Patent Application No. PCT/JP2011/076186 and English translation thereof.

* cited by examiner

*Primary Examiner* — Tashiana Adams
(74) *Attorney, Agent, or Firm* — Squire Sanders (US) LLP

(57) ABSTRACT

A saddle-type vehicle is provided with: a seat on which a driver sits; a fuel tank positioned in front of the seat; an engine positioned below the fuel tank and having a crankcase and a cylinder projecting upward from a front of the crankcase; and a fuel vapor passage that is connected to the fuel tank and emits evaporated fuel in the fuel tank to an outside of the fuel tank. At least a part of the fuel vapor passage passes behind the cylinder. The fuel vapor passage is connected to the crankcase mat a portion in a rear side of the cylinder and opens toward oil in the engine.

8 Claims, 4 Drawing Sheets

SADDLE-TYPE VEHICLE

TECHNICAL FIELD

The present invention relates to a saddle-type vehicle.

BACKGROUND ART

In a related art, a saddle-type vehicle equipped with a canister has been known in which evaporated fuel in a fuel tank is temporarily absorbed to the canister from which fuel is supplied to an engine intake system (for example, Patent Document 1).

Further, a fuel vapor processing apparatus for an internal combustion engine has been known in which evaporated fuel in a fuel tank is temporarily absorbed to oil in an engine from which fuel is supplied to an engine intake system (for example, Patent Document 2).

PRIOR ART DOCUMENTS

Patent Document

Patent Document 1: WO 2009/154120
Patent Document 2: JP-U-49-088172

SUMMARY OF INVENTION

Problem to be Solved by the Invention

However, the saddle-type vehicle disclosed in Patent Document 1 has a problem that there is a limitation in a design of a vehicle body in order to ensure a placement location and the vehicle body becomes larger when the canister is provided in the saddle-type vehicle. Further, in the fuel vapor processing apparatus for the internal combustion engine disclosed in Patent Document 2, there are various adaptation problems in layout or usability as a saddle-type vehicle in order to mount the processing apparatus on the saddle-type vehicle.

The invention has been made to solve the above-described problems and an object of the invention is to provide a saddle-type vehicle which is capable of handling evaporated fuel in a fuel tank without using a canister.

Means for Solving the Problem

In order to achieve the above objects, according to a first aspect, a saddle-type vehicle is provided with a seat on which a driver is seated, a fuel tank disposed in front of the seat, an engine disposed below the fuel tank and including a crankcase and a cylinder protruding upward from a front portion of the crankcase, and a fuel vapor passage connected to the fuel tank and configured to discharge evaporated fuel in the fuel tank to the outside of the fuel tank. At least a part of the fuel vapor passage passes behind the cylinder. The fuel vapor passage is connected to a part of the crankcase placed at a rear of the cylinder and opens toward oil in the engine.

According to a second aspect, in addition to the configuration of the first aspect, the saddle-type vehicle is provided with an intake device extending rearward from the cylinder and having an inlet pipe, a throttle body, a connecting tube and an air cleaner box, and an air introduction passage connecting part provided in the middle of the fuel vapor passage and connected to an air introduction passage for introducing air into the fuel vapor passage. The air introduction passage connecting part is placed below the fuel tank and also in front of the air cleaner box.

According to a third aspect, in addition to the configuration of the second aspect, the saddle-type vehicle is provided with a first check valve provided in the middle of the fuel vapor passage and configured to stop the flow from the engine side toward the fuel tank side. The air introduction passage connecting part and the first check valve are arranged in a vertically separated manner while interposing the intake device therebetween, as seen from a side of a vehicle.

According to a fourth aspect, in addition to the configuration of one of the first to third aspects, the intake device is arranged offset to one side in a vehicle width direction and the fuel vapor passage is arranged to pass through the inside of the intake device in the vehicle width direction.

According to a fifth aspect, in addition to the configuration of one of the first to third aspects, the intake device is curved to one side in a vehicle width direction and the fuel vapor passage is arranged to pass through the curved inside of the intake device.

According to a sixth aspect, in addition to the configuration of one of the second to fifth aspects, a part of the fuel vapor passage is supported by the intake device.

According to a seventh aspect, in addition to the configuration of one of the second to sixth aspects, an upper surface of the air cleaner box is covered with the seat, the air introduction passage extends rearward along the upper surface of the air cleaner box and an open end of the air introduction passage is located in the vicinity of an intake port of the air cleaner box.

According to an eighth aspect, in addition to the configuration of one the second to seventh aspects, the saddle-type vehicle is provided with a seat frame configured to support the seat and arranged to extend rearward and upward and a second check valve provided in the middle of the air introduction passage and configured to stop the flow from the engine side toward the atmospheric side. At least a part of the air introduction passage located downstream of the second check valve is arranged forward and downward along the seat frame.

Advantage of the Invention

According to the first aspect, since at least a part of the fuel vapor passage passes through the rear of the cylinder, is connected to a portion of the crankcase located on the rear of the cylinder and opens to the oil in the engine, it is possible to handle the fuel in the fuel tank without using a canister. Further, since the fuel vapor passage can be arranged utilizing a relatively empty portion, an external appearance can be improved. Furthermore, since the fuel vapor passage is arranged on the rear of the cylinder, air warmed by the cylinder flows to the rear and therefore the fuel can be easily vaporized, even when the evaporated fuel is liquefied due to condensation or the like in the fuel vapor passage. In this way, it is possible to easily feed the fuel to the crankcase.

According to the second aspect, since the air introduction passage connecting part is arranged below the fuel tank and in front of the air cleaner box, it is possible to effectively utilize a dead space.

According to the third aspect, since the air introduction passage connecting part and the first check valve are vertically distributed with the intake device interposed therebetween, as seen from the side of a vehicle, it is possible to effectively utilize a dead space at top and bottom of the intake device.

According to the fourth aspect, since the intake device is arranged offset to one side in a vehicle width direction and the fuel vapor passage is arranged to pass through the inside of the intake device in the vehicle width direction, the fuel vapor passage can be placed inside a vehicle body and therefore an external appearance can be improved. In addition, it is possible to effectively utilize the dead space.

According to the fifth aspect, since the intake device is curved to one side in the vehicle width direction and the fuel vapor passage is arranged to pass through the curved inside of the intake device, it is possible to effectively utilize the dead space.

According to the sixth aspect, since a part of the fuel vapor passage is supported by the intake device, it is not necessary to provide a separate member for supporting the fuel vapor passage and therefore it is possible to reduce the manufacturing cost.

According to the seventh aspect, since an upper surface of the air cleaner box is covered with the seat, the air introduction passage extends rearward along the upper surface of the air cleaner box and an open end of the air introduction passage is located in the vicinity of an intake port of the air cleaner box, air in the vicinity of the intake port of the air cleaner box in which relatively clean air is collected can be introduced into the air introduction passage.

According to the eighth aspect, since at least a part of the air introduction passage located downstream of the second check valve is arranged forward and downward along the seat frame, the air introduction passage is inclined downward toward the air introduction passage connecting part. By doing so, the fuel can easily flow into the fuel vapor passage even when the fuel enters the air introduction passage, for example.

DESCRIPTION OF EMBODIMENTS

Figure 1:
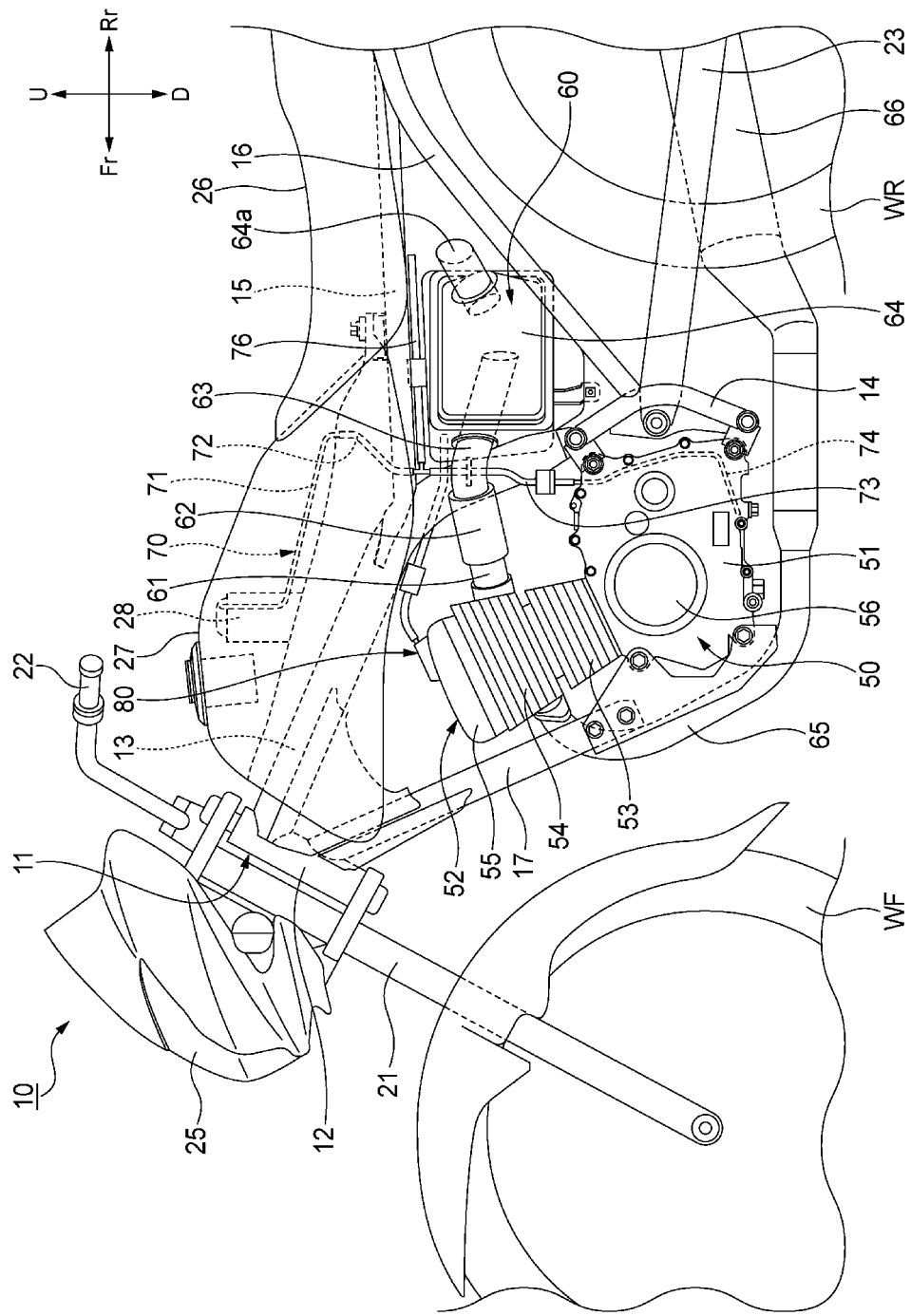
FIG. 1 is a left side view showing a saddle-type vehicle according to an exemplary embodiment of the invention.

Hereinafter, a saddle-type vehicle according to an exemplary embodiment of the invention will be described in detail with reference to the drawings. Here, the drawings are viewed in directions of reference numerals, and in the following description, front and rear, left and right, up and down are defined in accordance with the direction as seen from a rider. In the drawings, a front side of a vehicle is designated by reference numeral Fr, a rear side thereof is designated by reference numeral Rr, a left side thereof is designated by reference numeral L, a right side thereof is designated by reference numeral R, an upper side thereof is designated by reference numeral U and a lower side thereof is designated by reference numeral D.

Figure 2:
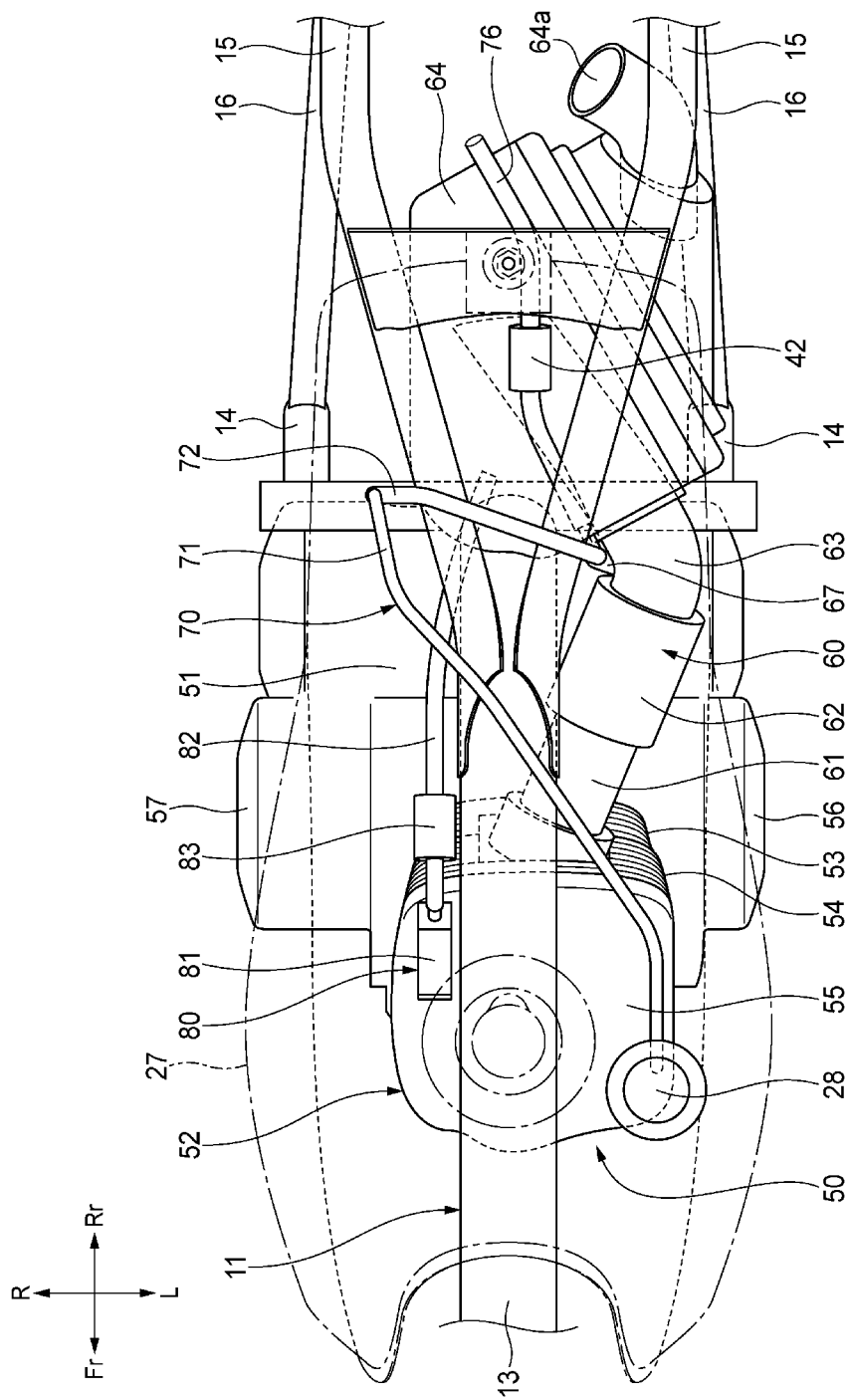
FIG. 2 is a plan view showing the saddle-type vehicle shown in FIG. 1.

As shown in FIG. 1 and FIG. 2, a motorcycle (a saddle-type vehicle) 10 of the embodiment includes a vehicle body frame 11 which is configured by a head pipe 12 provided at a front end thereof, a main frame 13 extending rearward and downward from the head pipe 12, a pair of left and right pivot frames 14 connected to a rear end of the main frame 13 and extending downward therefrom, a pair of left and right seat frames 15 connected to a rear portion of the main frame 13 and extending rearward and upward therefrom, a pair of left and right sub frames 16 connected to an intermediate portion of the pair of left and right pivot frames 14 and extending rearward and upward therefrom and a down frame 17 extending rearward and downward from the head pipe 12. Rear ends of the sub frame are connected to the pair of left and right seat frames 15. An engine 50 is mounted to the pivot frames 14 and the down frame 17.

The motorcycle 10 includes a front fork 21 steerably supported on the head pipe 12, a front wheel WF rotatably supported on a lower end of the front fork 21, a steering handle 22 attached to an upper end of the front fork 21, a swing arm 23 pivotably supported on the pivot frames 14, a rear wheel WR rotatably supported on a rear end of the swing arm 23, a headlight 25 provided in front of the head pipe 12, a seat 26 which is supported on an upper surface of the seat frames 15 and on which a driver is seated, and a fuel tank 27 disposed in front of the seat 26.

As shown in FIG. 1 and FIG. 2, the engine 50 is disposed below the fuel tank 27. Outer shell of the engine is mainly configured by a crankcase 51, a cylinder 52 protruding upward from a front portion of the crankcase 51, an ACG (generator) cover 56 covering an opening on the left side of the crankcase 51 and a clutch cover 57 covering an opening on the right side of the crankcase 51. The cylinder 52 is configured by a cylinder block 53, a cylinder head 54 and a cylinder head cover 55.

As shown in FIG. 1, an intake port (not shown) is formed on a rear portion of the cylinder head 54 and an intake device 60 is connected to the intake port so as to face rearward. The intake device includes an inlet pipe 61, a throttle body 62, a connecting tube 63 and an air cleaner box 64. In addition, the intake device 60 is arranged offset to a left side in a vehicle width direction and curved to an outer side in the vehicle width direction, as seen from a plan view of a vehicle. Further, an exhaust port (not shown) is formed on a front portion of the cylinder head 54 and a muffler 66 is connected to the exhaust port via an exhaust pipe 65.

Figure 3:
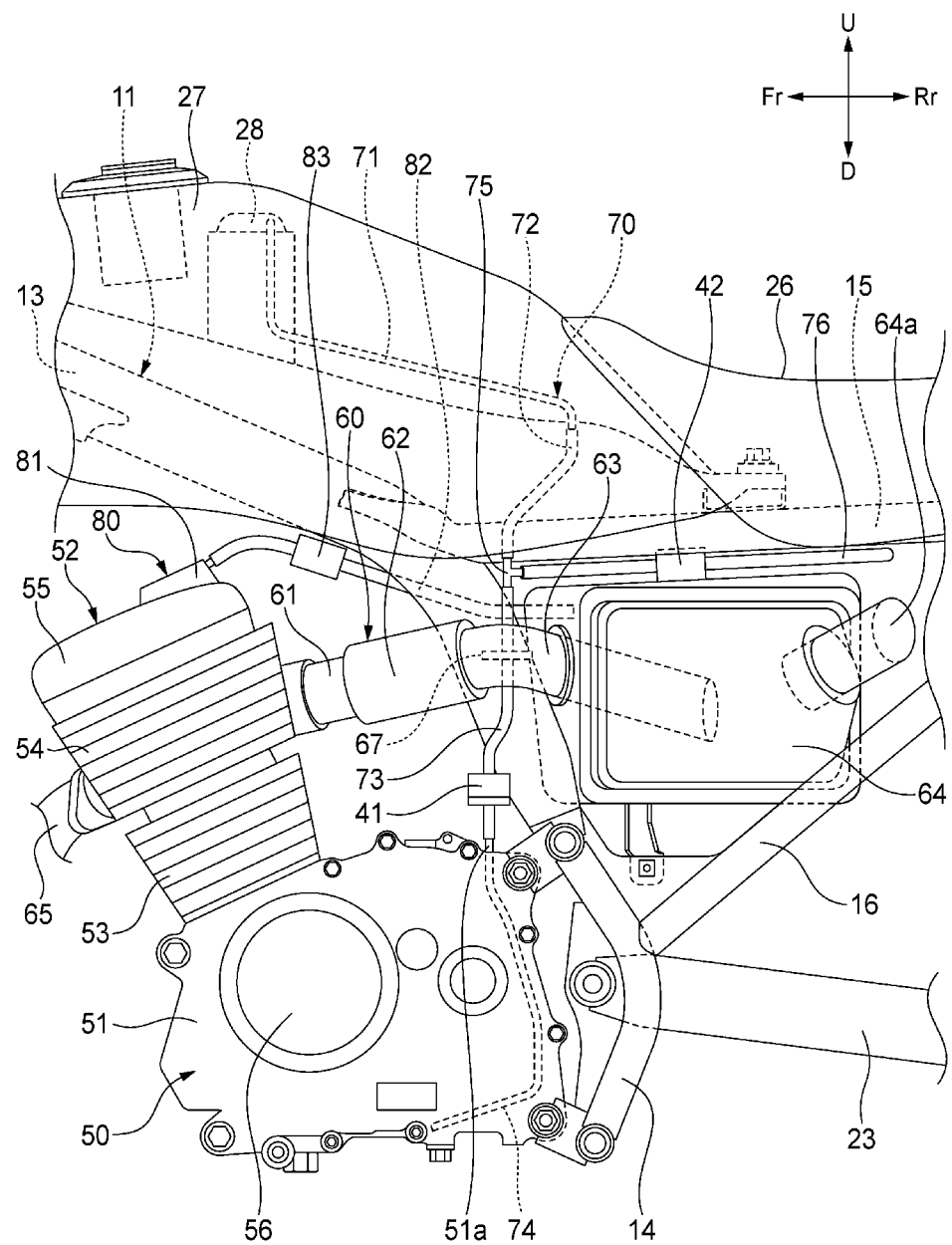
FIG. 3 is an enlarged left side view showing the surroundings of a fuel tank, an engine and an intake device shown in FIG. 1.

As shown in FIG. 1 to FIG. 3, the motorcycle 10 includes a fuel vapor passage 70 connected to the fuel tank 27 and a blow-by gas reducing device 80. The fuel vapor passage 70 discharges evaporated fuel in the fuel tank 27 to the outside of the fuel tank 27 and supplies the evaporated fuel into the crankcase 51 of the engine 50. The blow-by gas reducing device 80 supplies blow-by gas in the engine 50 into a clean room of the air cleaner box 64 of the intake device 60.

The fuel vapor passage 70 includes a first pipe 71 made of metal, a second tube 72 made of rubber and connected to a downstream end of the first pipe 71, a T-shaped three pronged joint (air introduction passage connecting part) 75 connected to a downstream end of the second tube 72, a third tube 73 made of rubber and connected to an end of the straight side of the three pronged joint 75, a pipe connecting part 51a protruding from an upper surface of a rear portion of the crankcase 51 and connected to a downstream end of the third tube 73 and a fourth pipe 74 made of metal and connected to the pipe connecting part 51a. An upstream end of the first pipe 71 is connected to a gas-liquid separator 28 provided in the fuel tank 27.

The first pipe 71 extends obliquely rearward and downward from the gas-liquid separator 28 disposed on a vehicle left side in the fuel tank 27 and toward a vehicle right side. The first pipe is arranged to intersect with the main frame 13, as seen from a plan view. A downstream end of the first pipe extends to a vehicle right side of a rear end of the main frame 13 and protrudes from a lower surface of the fuel tank 27 to the outside of the fuel tank 27. Further, the first pipe 71 is a metallic pipe.

The second tube 72 extends obliquely downward from a downstream end of the first pipe 71 and toward a vehicle left side. The second tube is arranged to intersect with the main frame 13. A downstream end of the second tube extends to the inside of the intake device 60 in a vehicle width direction, which is disposed at a vehicle left side. Further, the second tube 72 is a rubber tube.

The third tube 73 extends downward from an end of the straight side of the three pronged joint 75 and is arranged to pass through the inside of the intake device 60 in a vehicle width direction, which is disposed at a vehicle left side. A downstream end of the third tube is connected to the pipe connecting part 51a of the crankcase 51 which is located on the rear of the cylinder 52. Further, the third tube 73 is arranged to pass through the rear of the cylinder 52 of the engine 50. In addition, a first check valve 41 is provided in the middle of the third tube 73 and stops the flow from the engine 50 side to the fuel tank 27 side. Further, the third tube 73 is a rubber tube.

Figure 4:
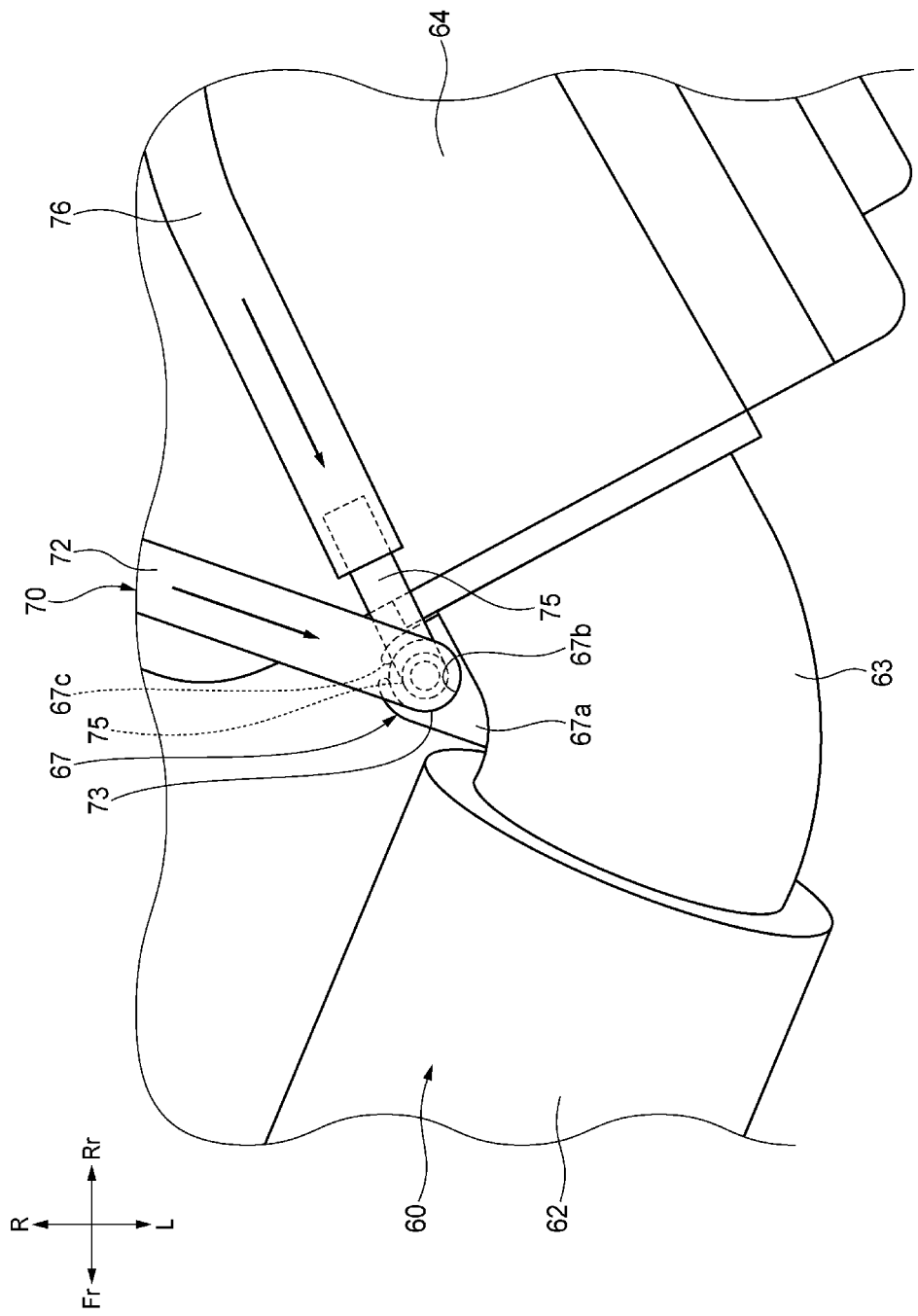
FIG. 4 is an enlarged plan view showing the surroundings of a connecting tube shown in FIG. 1.

As shown in FIG. 4, an upper portion of the third tube 73 is supported by a pipe support part 67 which is provided on the inside of the curved connecting tube 63 of the intake device 60. The pipe support part 67 includes a plate-shaped portion 67a which is formed integrally on the inside of the curved connecting tube 63, a through hole 67b which is formed to penetrate vertically the plate-shaped portion 67a and through which the third tube 73 is inserted and a slit 67c which is formed in the plate-shaped portion 67a and allows the third tube 73 to be inserted into the through hole 67b. By doing so, the third tube 73 is arranged to pass through the inside of the curved connecting tube 63 of the intake device 60.

The fourth pipe 74 extends downward from the pipe connecting part 51a of the crankcase 51 and is arranged along an inner surface of the crankcase 51. A downstream end of the fourth pipe extends to a bottom portion of the crankcase 51. By doing so, the downstream end of the fourth pipe 74 opens toward oil in the crankcase 51. Further, the fourth pipe 74 is a metallic pipe.

The three pronged joint 75 is connected to a downstream end of the second tube 72 and arranged below the fuel tank 27 and in front of the air cleaner box 64. Further, an air introduction tube (air introduction passage) 76 is connected to an end of the branched side of three pronged joint 75 and adapted to introduce air into the fuel vapor passage 70.

The air introduction tube 76 extends rearward along an upper surface of the air cleaner box 64 from the end of the branched side of the three pronged joint 75 and an open end (upstream end) thereof is located near an intake port of an intake pipe 64a of the air cleaner box 64. Further, an upper surface of the air cleaner box 64 is covered with the seat 26. Further, a second check valve 42 is provided in the middle of the air introduction tube 76 and stops the flow from the engine 50 side (or the fuel tank 27 side) to the atmospheric side. In addition, the air introduction tube 76 is a rubber tube.

The air introduction tube 76 is arranged forward and downward along the seat frame 15. Further, in order to arrange the air introduction tube 76 forward and downward, an upper surface of the air cleaner box 64 is formed rearward and upward, similar to the seat frame 15.

According to the embodiment, the three pronged joint 75 and the first check valve 41 are vertically distributed with the connecting tube 63 of the intake device 60 interposed therebetween, as seen from the side of a vehicle.

The blow-by gas reducing device 80 is provided on an upper surface of the cylinder head cover 55. The blow-by gas reducing device includes a gas extraction part 81 to take out blow-by gas in the engine 50, a gas supply pipe 82 which has an upstream end connected to the gas extraction part 81 and a downstream end connected to a clean room of the air cleaner box 64 and a purge control valve 83 provided in the middle of the gas supply pipe 82. Here, the purge control valve 83 is a solenoid valve which is opened/closed by a solenoid.

In the motorcycle 10 configured as described above, air is introduced through the air introduction tube 72 when the interior of the fuel tank 27 becomes negative pressure relative to atmosphere pressure. The introduced air is supplied to the fuel tank 27 via the air introduction tube 72, the second check valve 42, the three pronged joint 75, the second tube 72 and the first pipe 71, so that the pressure in the fuel tank 27 becomes equal to the atmospheric pressure.

Meanwhile, when the interior of the fuel tank 27 becomes positive pressure (for example, when the fuel in the fuel tank 27 is evaporated), air or the evaporated fuel is released into oil in the crankcase 51 through the fuel vapor passage 70 from the interior of the fuel tank 27. At this time, the evaporated fuel is temporarily dissolved in the oil. At this time, since the second check valve 42 is provided in the air introduction tube 76, there is no case that the evaporated fuel is released into the atmosphere.

The fuel dissolved in the oil of the crankcase 51 is evaporated again in the engine 50 during engine drive and thus becomes evaporated fuel. The evaporated fuel is supplied along with the evaporated oil to the air cleaner box 64 through the blow-by gas reducing device 80 and then combusted in a combustion chamber of the engine 50 through the intake device 60.

As described above, according to the motorcycle 10 of the embodiment, since the third tube 73 which is a portion of the fuel vapor passage 70 passes through the rear of the cylinder 52, is connected to a portion of the crankcase 51 located on the rear of the cylinder 52 and opens to the oil in the engine 50, it is possible to handle the fuel in the fuel tank 27 without using a canister. Further, since the fuel vapor passage 70 can be arranged utilizing a relatively empty portion, an external appearance can be improved. Furthermore, since the third tube 73 is arranged on the rear of the cylinder 52, air warmed by the cylinder 52 flows to the rear and therefore the fuel can be easily vaporized, even when the evaporated fuel is liquefied due to condensation or the like in the fuel vapor passage 70. In this way, it is possible to easily feed the fuel to the crankcase 51.

Further, according to the motorcycle 10 of the embodiment, since the three pronged joint 75 is arranged below the fuel tank 27 and in front of the air cleaner box 64, it is possible to effectively utilize a dead space.

In addition, according to the motorcycle 10 of the embodiment, since the three pronged joint 75 and the first check valve 41 are vertically distributed with the intake device 60 interposed therebetween, as seen from the side of a vehicle, it is possible to effectively utilize a dead space at top and bottom of the intake device 60.

Further, according to the motorcycle 10 of the embodiment, since the intake device 60 is arranged offset to a left side in a vehicle width direction and the fuel vapor passage 70 is arranged to pass through the inside of the intake device 60 in the vehicle width direction, the fuel vapor passage 70 can be placed inside a vehicle body and therefore an external appearance can be improved. In addition, it is possible to effectively utilize the dead space.

Further, according to the motorcycle 10 of the embodiment, since the intake device 60 is curved to a left side in the vehicle width direction and the fuel vapor passage 70 is arranged to pass through the inside of the curved connecting tube 63 of the intake device 60, it is possible to effectively utilize the dead space.

Further, according to the motorcycle 10 of the embodiment, since the third tube 73 of the fuel vapor passage 70 is supported by the intake device 60, it is not necessary to provide a separate member for supporting the fuel vapor passage 70 and therefore it is possible to reduce the manufacturing cost.

Further, according to the motorcycle 10 of the embodiment, since an upper surface of the air cleaner box 64 is covered with the seat 26, the air introduction tube 76 extends rearward along the upper surface of the air cleaner box 64 and an open end of the air introduction tube is located in the vicinity of an intake port of the air cleaner box 64, air in the vicinity of the intake port of the air cleaner box 64 in which relatively clean air is collected can be introduced into the air introduction tube 76.

Further, according to the motorcycle 10 of the embodiment, since the air introduction tube 76 is arranged forward and downward along the seat frame 15, the air introduction tube 76 is inclined downward toward the three pronged joint 75. By doing so, the fuel can easily flow into the fuel vapor passage 70 even when the fuel enters the air introduction tube 76, for example.

Hereinabove, although the invention has been described in detail with reference to particular embodiments, it is apparent to those skilled in the art that the exemplary embodiments can be variously modified without departing a spirit and a scope of the invention.

This application is based on Japanese Patent Application (Patent Application No. 2010-262499) filed on Nov. 25, 2010 and the contents of which are incorporated herein by reference.

DESCRIPTION OF REFERENCE NUMERALS

10: MOTOR CYCLE (SADDLE-TYPE VEHICLE)
15: SEAT FRAME
26: SEAT
27: FUEL TANK
41: FIRST CHECK VALVE
42: SECOND CHECK VALVE
50: ENGINE
51: CRANKCASE
52: CYLINDER
53: CYLINDER BLOCK
54: CYLINDER HEAD
55: CYLINDER HEAD COVER
60: INTAKE DEVICE
61: INLET PIPE
62: THROTTLE BODY
63: CONNECTING TUBE
64: AIR CLEANER BOX
70: FUEL VAPOR PASSAGE
71: FIRST PIPE
72: SECOND TUBE
73: THIRD TUBE
74: FOURTH PIPE
75: THREE PRONGED JOINT (AIR INTRODUCTION PASSAGE CONNECTING PART)
76: AIR INTRODUCTION TUBE (AIR INTRODUCTION PASSAGE)
80: BLOW-BY GAS REDUCING DEVICE
81: GAS EXTRACTION PART
82: GAS SUPPLY PIPE
83: PURGE CONTROL VALVE

The invention claimed is:

1. A saddle-type vehicle comprising:
a seat on which a driver is seated;
a fuel tank disposed in front of the seat;
an engine disposed below the fuel tank and including a crankcase and a cylinder protruding upward from a front portion of the crankcase; and
a fuel vapor passage connected to the fuel tank and configured to discharge evaporated fuel in the fuel tank to an outside of the fuel tank,
wherein at least a part of the fuel vapor passage passes behind the cylinder, and the fuel vapor passage is connected to the crankcase at a portion in a rear side of the cylinder and opens toward oil in the engine.

2. The saddle-type vehicle according to claim 1, further comprising:
an intake device extending rearward from the cylinder and including an inlet pipe, a throttle body, a connecting tube, and an air cleaner box; and
an air introduction passage connecting part provided in a middle of the fuel vapor passage and connected to an air introduction passage for introducing air into the fuel vapor passage,
wherein the air introduction passage connecting part is placed below the fuel tank and also in front of the air cleaner box.

3. The saddle-type vehicle according to claim 2, further comprising:
a first check valve provided in a middle of the fuel vapor passage and configured to stop a flow from the engine side toward the fuel tank side,
wherein the air introduction passage connecting part and the first check valve are arranged in a vertically separated manner while interposing the intake device therebetween, as seen from a side of a vehicle.

4. The saddle-type vehicle according to claim 1, wherein the intake device is arranged offset to one side in a vehicle width direction, and
wherein the fuel vapor passage is arranged to pass through an inside of the intake device in the vehicle width direction.

5. The saddle-type vehicle according to claim 1, wherein the intake device is curved to one side in a vehicle width direction, and
wherein the fuel vapor passage is arranged to pass through a curved inside of the intake device.

6. The saddle-type vehicle according to claim 2, wherein a part of the fuel vapor passage is supported by the intake device.

7. The saddle-type vehicle according to claim 2, wherein an upper surface of the air cleaner box is covered with the seat,
wherein the air introduction passage extends rearward along the upper surface of the air cleaner box, and
an open end of the air introduction passage is located in a vicinity of an intake port of the air cleaner box.

8. The saddle-type vehicle according to claim 2, further comprising:
a seat frame that supports the seat and is arranged to extend rearward and upward; and
a second check valve provided in a middle of the air introduction passage and configured to stop a flow from the engine side toward the atmospheric side,
wherein at least a part of the air introduction passage located downstream of the second check valve is arranged forward and downward along the seat frame.

* * * * *